(12) United States Patent
Lin

(10) Patent No.: US 9,792,830 B2
(45) Date of Patent: Oct. 17, 2017

(54) FULL MOTION RACING SIMULATOR

(71) Applicant: Linkvox Inc., Pomona, CA (US)

(72) Inventor: Howard Tze-Hao Lin, Covina, CA (US)

(73) Assignee: SIGMA INTEGRALE LLC, Pomona, CA (US)

( * ) Notice: Subject to any disclaimer, the term of this patent is extended or adjusted under 35 U.S.C. 154(b) by 548 days.

(21) Appl. No.: 14/515,971

(22) Filed: Oct. 16, 2014

(65) Prior Publication Data

US 2016/0111014 A1   Apr. 21, 2016

(51) Int. Cl.
*G09B 9/04*    (2006.01)
*G09B 9/042*   (2006.01)

(52) U.S. Cl.
CPC ............. *G09B 9/04* (2013.01); *G09B 9/042* (2013.01)

(58) Field of Classification Search
CPC . G09B 9/00; G09B 9/003; G09B 9/02; G09B 9/04; G09B 9/042; G09B 9/42; G09B 9/058; G09B 9/08
USPC ......... 280/6.154, 124.134, 124.135, 124.136
See application file for complete search history.

(56) References Cited

U.S. PATENT DOCUMENTS

| | | | | |
|---|---|---|---|---|
| 2,148,504 A * | 2/1939 | Richter | ............... | B60G 21/00 267/187 |
| 2,712,946 A * | 7/1955 | Cicero | ............... | B60G 17/0272 267/252 |
| 2,933,322 A * | 4/1960 | Derse, Sr. | ............... | B62B 5/02 280/43 |
| 3,075,782 A * | 1/1963 | Weber, Sr. | ............. | A63G 19/02 280/1.192 |
| 3,151,872 A * | 10/1964 | Weber, Sr. | ............... | B62K 9/02 280/262 |
| 3,246,782 A * | 4/1966 | Ballamy | ................. | A61G 3/065 280/43.23 |
| 3,689,103 A * | 9/1972 | Meulendyk | .......... | B60G 17/005 180/41 |
| 3,905,134 A * | 9/1975 | Greenleaf | ............. | G09B 25/02 434/375 |
| 3,921,999 A * | 11/1975 | Masser | ................. | B60G 5/047 267/24 |

(Continued)

OTHER PUBLICATIONS

International Search Report and Written Opinion issued in corresponding application PCT/US2014/068735, issued on Mar. 16, 2015, pp. 1-7.

*Primary Examiner* — James Hull
(74) *Attorney, Agent, or Firm* — Burris Law, PLLC

(57) ABSTRACT

A full motion racing simulator is configured based on a real motor vehicle and includes wheels, a vehicle frame, and an actuating system for pivotably supporting the vehicle frame on the wheels. The actuating system includes a plurality of actuating assemblies each including a connecting structure pivotably connecting the vehicle frame to a corresponding one of the wheels, an actuator pivotably mounted to the vehicle frame, a push element pivotably connected to the connecting structure, and a rocker arm rotatably mounted to the vehicle frame and pivotably connected to the actuator and the push element. Upon actuation of the actuator, the actuator causes the rocker arm to rotate relative to the vehicle frame and to push the push element such that the push element causes the connecting structure to pivot relative to the wheels and to move the vehicle frame.

20 Claims, 7 Drawing Sheets

(56) References Cited

U.S. PATENT DOCUMENTS

| | | | | |
|---|---|---|---|---|
| 4,248,447 A * | 2/1981 | Hart | ............... | B60G 9/027 |
| | | | | 280/124.106 |
| 4,700,798 A * | 10/1987 | Johansson | ............... | B62D 61/12 |
| | | | | 180/198 |
| 5,433,608 A | 7/1995 | Murray | | |
| 6,015,330 A * | 1/2000 | Simmons | ............... | A63H 17/004 |
| | | | | 446/431 |
| 6,098,995 A * | 8/2000 | Danis | ............... | B60G 17/017 |
| | | | | 280/124.179 |
| 6,283,757 B1 * | 9/2001 | Meghnot | ............... | G09B 9/46 |
| | | | | 434/29 |
| 9,442,043 B2 * | 9/2016 | Tagami | ............... | G01M 17/007 |
| 2007/0260372 A1 * | 11/2007 | Langer | ............... | G01M 17/04 |
| | | | | 701/31.4 |
| 2007/0260373 A1 * | 11/2007 | Langer | ............... | G01M 17/007 |
| | | | | 701/31.4 |
| 2007/0260438 A1 * | 11/2007 | Langer | ............... | G01M 17/007 |
| | | | | 703/8 |
| 2010/0136858 A1 * | 6/2010 | King | ............... | B60F 3/003 |
| | | | | 440/12.5 |

\* cited by examiner

FULL MOTION RACING SIMULATOR

FIELD

The present application relates to full motion racing simulators for video games.

BACKGROUND

The statements in this section merely provide background information related to the present disclosure and may not constitute prior art.

Video game racing car simulators are known in the art. A typical racing car simulator includes a stationary base frame, a seat, and a plurality of actuators. The plurality of actuators are connected to the seat to apply force on the seat to move and tilt the seat for simulating sitting in a driver's seat of a racing car when playing video game racing car simulations. In the typical racing car simulator, however, only the seat is movable and the base frame is stationary. Another typical racing car simulator may have four actuators located at each of the four corners of a platform, thereby providing full motion to a typical simulator. The typical racing car simulator generally does not include a door or a car ceiling and thus does not look like a real car. Even if the door and the car ceiling are mounted to enclose the car seat, the simulator is the stationary type. Therefore, the virtual reality experience is still lacking in the typical racing car simulators.

SUMMARY

The present application provides a full motion racing simulator by using an actual motor vehicle, including but not limited to, a sedan, a sports utility vehicle (SUV), and a pickup truck, to enhance the virtual reality experience. In the full motion racing simulator, an entire vehicle frame is moved and tilted by four electric linear actuators despite the heavy weight of the actual motor vehicles. Therefore, a user's virtual reality experience of driving a racing car is enhanced when the user plays a car racing video game.

In one form of the present disclosure, an actuating system is provided for a full motion racing simulator for movably supporting a vehicle frame on a support structure. The actuating system includes at least one actuating assembly. The actuating assembly includes an actuator pivotably connected to the vehicle frame, a push element, a rocker arm rotatably mounted to the frame and pivotably connected to the push element and the actuator, and a connecting structure pivotably connected to the vehicle frame and the support structure. Upon actuation of the actuator, the actuator causes the rocker arm to rotate relative to the frame such that the rocker arm pushes the push element and the push element moves the vehicle frame through the connecting structure.

In another form, a full motion racing simulator includes a support structure, a vehicle frame, and an actuating system for moveably supporting the vehicle frame on the support structure. The actuating system includes a plurality of actuating assemblies each including an actuator pivotably connected to the vehicle frame, a push element, a rocker arm rotatably mounted to the vehicle frame and pivotably connected to the push element and the actuator, and a connecting structure pivotably connected to the vehicle frame and the support structure. Upon actuation of the actuator, the actuator causes the rocker arm to rotate relative to the vehicle frame such that the rocker arm pushes the push element and the push element moves the vehicle frame through the connecting structure.

In still another form, a full motion racing simulator includes wheels, a vehicle frame including a base frame and a side frame extending upwardly from the base frame, and a plurality of actuating assemblies for moveably supporting the vehicle frame on the wheels. The actuating assemblies each include a connecting structure pivotably connected to a corresponding one of the wheels, an actuator pivotably and movably to the base frame, a push rod pivotably connected to the connecting structure, and a rocker arm rotatably mounted to the side frame. The rocker arm includes a first portion pivotably connected to the actuator and a second portion pivotably connected to the push element. The first portion may be longer than the second portion. Upon actuation of the actuator, the actuator causes the rocker arm to rotate relative to the frame such that the rocker arm pushes the push element and that the push element causes the connecting structure to pivot relative to the wheels, thereby causing the vehicle frame to move.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
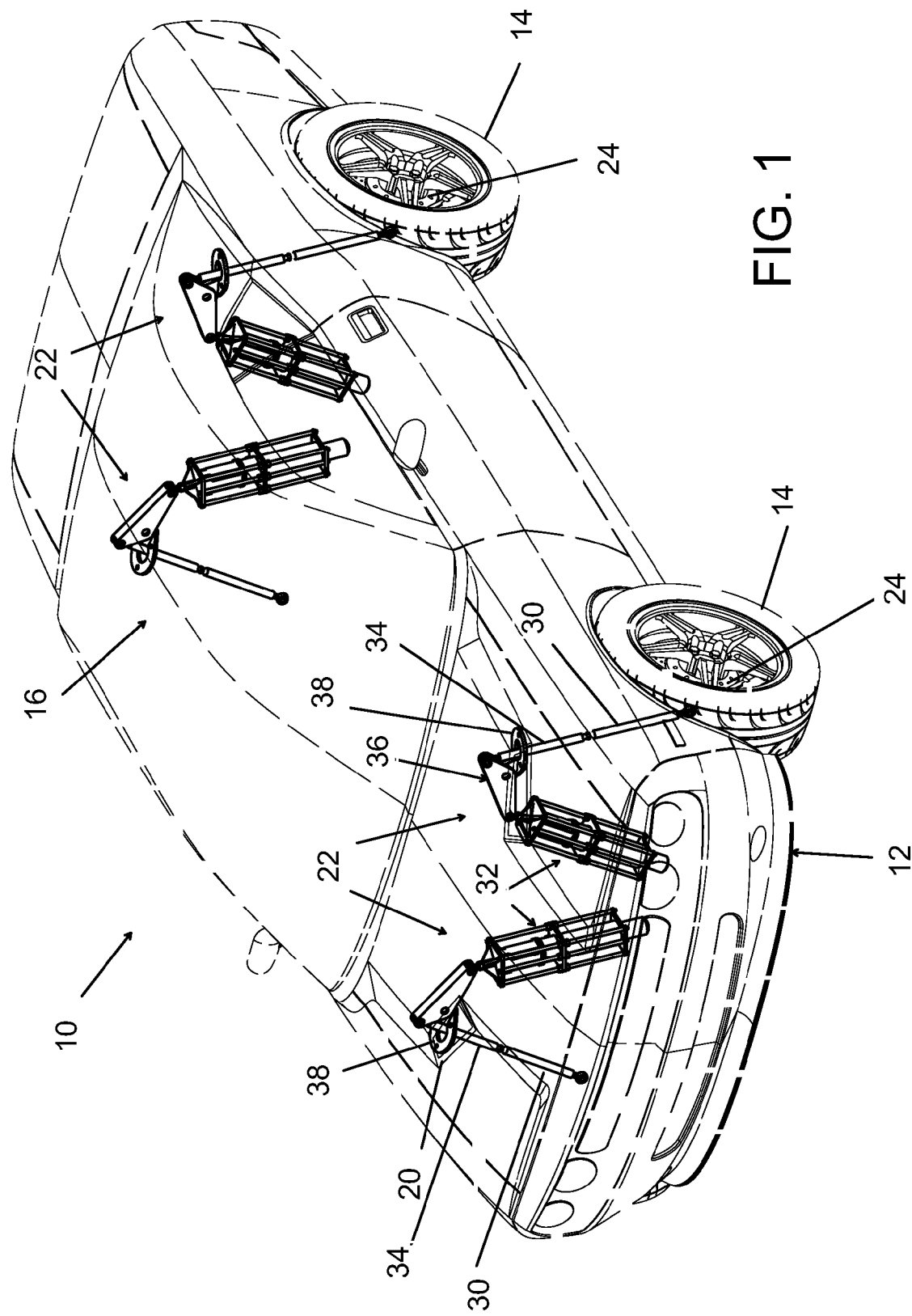
FIG. 1 is a schematic perspective view of a full motion racing simulator according to a first embodiment of the present disclosure.

The following description is merely exemplary in nature and is not intended to limit the present disclosure, application, or uses. It should be understood that throughout the drawings, corresponding reference numerals indicate like or corresponding parts and features.

Referring to FIG. 1, a full motion racing simulator 10 for video games, training, or educational purposes generally includes a vehicle frame 12, wheels 14, and an actuating system 16 for movably supporting the vehicle frame 12 on the wheels 14. The vehicle frame 12 may be a frame of a drivable, test or abandoned motor vehicle, including but not limited to a sedan, an SUV, and a truck. The vehicle frame 12 supports the constituent components of the motor vehicle, such as an engine, a transmission, or an exhaust system, thereon. In a typical motor vehicle, the vehicle frame 12 is movably supported on the wheels 14 by a suspension system. In the full motion racing simulator 10 of the present application, the actuating system 16 is configured to replace the existing suspension system of the motor vehicle while using some of the components of the suspension system, to movably support the vehicle frame 12 on the wheels 14. The actuating system 16 causes the vehicle frame 12 to move, tilt or vibrate relative to the wheels 14 rest on the ground in response to operation of the steering wheel and the video game, thereby giving a user the feel of driving a real motor vehicle.

The vehicle frame 12 may include a base frame 18 (shown in FIG. 2) and a side frame 20 extending upwardly from the base frame 18. The constituent components of the motor vehicle are supported on the vehicle frame 12. Therefore, the vehicle frame 12 carries significant weight of the motor vehicle, which typically weighs 3000 to 4000 pounds (i.e., 1361 to 1816 kilograms) for a sedan or 6000 pounds (i.e., 2722 kilograms) for a pick-up truck. Therefore, the actuating system 16 need to have a load capacity of 3000 to 6000 pounds (1316 to 2722 kilograms) in order to cause the vehicle frame 12 to move, tilt and vibrate.

The actuating system 16 may include four actuating assemblies 22 pivotably connecting the frame 12 to the hubs 24 of the wheels 14. Two actuating assemblies 22 are mounted to a front portion of the vehicle frame 12 adjacent to the front pair of wheels 14, and two actuating assemblies 22 are mounted to a rear portion of the vehicle frame 12 adjacent to the rear pair of wheels 14. The four actuating assemblies 22 of the actuating system 16 jointly support the vehicle frame 12 thereon and cause the vehicle frame 12 to move, tilt or vibrate. It is understood that the actuating system 16 may include any number of actuating assemblies 22, including one actuating assembly, without departing from the scope of the present disclosure.

The actuating assemblies 22 each include a connecting structure 30, an actuator 32, a push element 34, and a rocker arm 36. The connecting structure 30 is pivotably connected to the vehicle frame 12 and a corresponding one of the wheel hubs 24 of the wheels 14. The push element 34 may be in the form of a push rod as shown in the first embodiment and is pviotably connected to the connecting structure. It is understood that the push element 34 can have other structure and configuration without departing from the scope of the present disclosure. A mounting member 38 may be optionally mounted to the side frame 20 of the vehicle frame 12. The rocker arm 36 is pivotably mounted to the mounting member 38 by, for example, a bearing.

Figure 2:
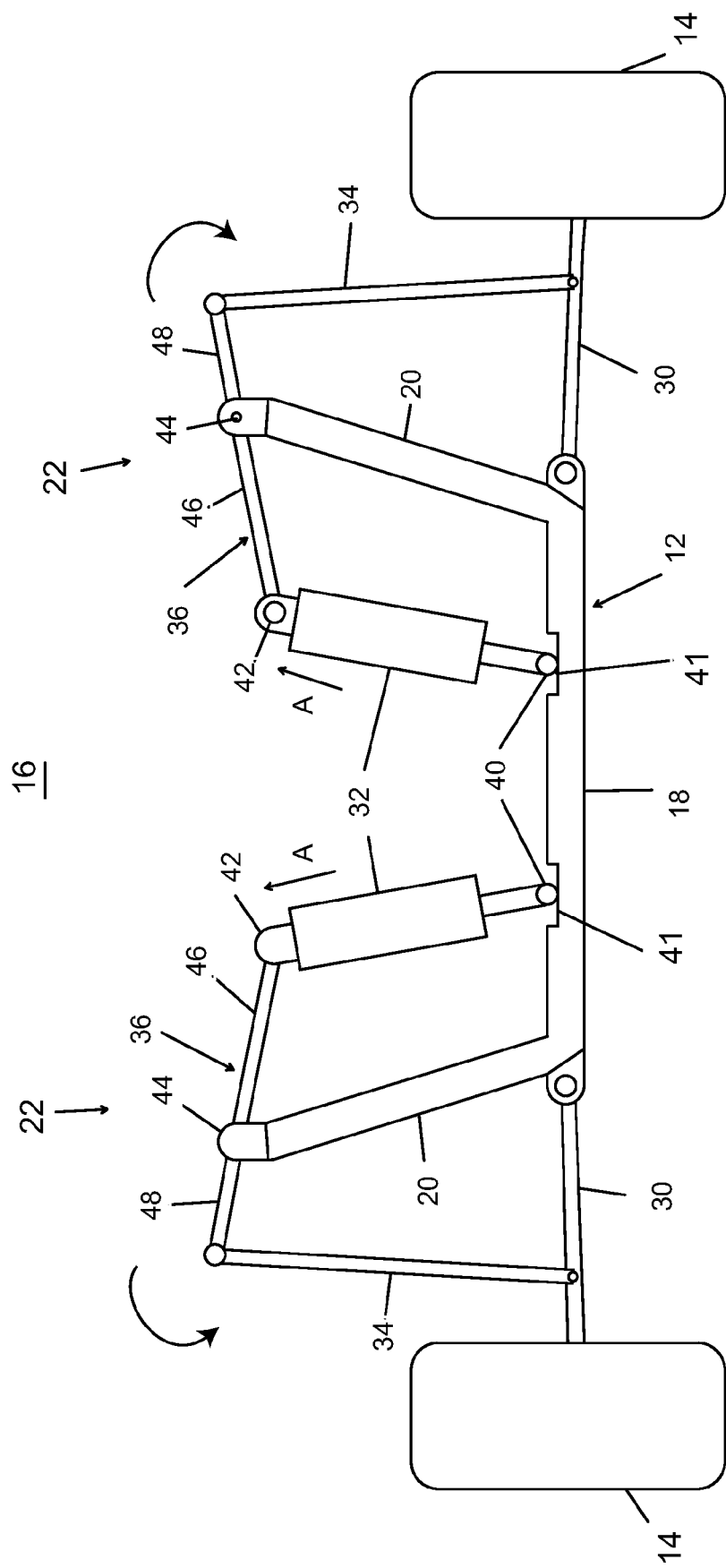
FIG. 2 is a schematic diagram of an actuating system for a full motion racing simulator according to a first embodiment of the present disclosure.

Referring to FIG. 2, various components of the actuating system 16 are schematically shown by linkage bars for illustrative purposes. FIG. 2 is not used to limit the configuration and shape of the various components of the actuating system 16. FIG. 2 shows only two actuating assemblies 22 pivotably mounted to the vehicle frame 12 and the wheel hubs 24 of the front or rear pair of the wheels 14. Alternatively, the wheels 14 can be replaced with any mechanical device or any support structure as long as the actuating system 16 can be pivotably mounted to the support structure.

The actuator 32 may be an electric linear actuator and has a first, lower end 40 pivotably mounted on the base frame 18 of the vehicle frame 12 and a second, upper end 42 pivotably mounted to the rocker arm 36. The upper end 42 of the actuator 32 is extendable and retractable relative to the lower end 40 in order to push/pull and rotate the rocker arm 36. The lower end 40 of the actuator 32 is preferably mounted to the base frame 18 through a roller joint 41 or a sliding joint, which allows the lower end 40 of the actuator 32 to slightly move relative to the base frame 18 of the vehicle frame 12 while pivoting. Therefore, the actuators 32 are pivotably and movably mounted to the base frame 18 of the vehicle frame 12. The actuators 32 are programmed to extend or retract in real time as the users drive the full motion racing simulator 10. The actuators 32 are electrically connected to a control module (not shown), which actuates one or more the actuators 32 in response to the operation of the steering wheel, thereby causing the vehicle frame 12 to move, tilt, and vibrate and allowing the user to feel as if he or she is driving a real automobile.

The rocker arm 36 may be an integral body, including a pivot 44, a first portion 46 and a second portion 48. The rocker arm 36 is rotatably mounted to the side frame 20 of the vehicle frame 12 and thus is movable together with the vehicle frame 12. The pivot 44 may be in the form of a bearing mounted in the mounting member 38 (shown in FIG. 1). Any conventional means that can provide rotatable support for the rocker arm 36 can be used. A free end of the first portion 46 of the rocker arm 36 is pivotably connected to the upper end 42 of the actuator 32. A free end of the second portion 46 of the rocker arm 36 is pivotably connected to the push element 34. The push element 34 is pivotably mounted to the connecting structure 30. The connecting structure 30 is pivotably connected to and disposed between the vehicle frame 12 and the wheel hub 24 of the wheel 14 and may be in the form of a straight bar in the present embodiment. One or both of the connecting structures 30 of the actuating assemblies 22 at the front or rear pair of wheels 14 may be configured to be movable relative to the corresponding wheel hub 24, for example, by using a roller joint or a sliding joint (not shown), to allow for improved articulation of the entire actuating system 16. The wheel 14 which includes the hub 24 and a rubber tire around the hub 24 can also be tilted relative to the ground due to the flexible nature of the rubber tire. The hub 24 is pivotable relative to the rubber tire to provide improved articulation of the full motion racing simulator 10.

The upper end 42 of the actuator 32 of each actuating assembly 22 is extendable and retractable relative to the lower end 40 so that the actuator 32 can push and pull the free end of the first portion 36 of the rocker arm 36 when the actuator 32 is actuated or de-actuated. When the upper end 42 of the actuator 32 extends in direction A in response to actuation of the actuator 32, the rocker arm 36 is caused to rotate relative to the vehicle frame 12. The second portion 48 of the rocker arm 36 pushes the push element 34 downward, which in turns, causes the connecting structure 30 to pivot around the wheel hub 24. The pivoting of the connecting structure 30 causes the vehicle frame 12 to move, pivot, or tilt. Therefore, a user who sits in the car seat experiences movement of the car.

The first portion 46 of the rocker arm 36 is longer than the second portion 48 such that the pushing force exerted by the push element 34 on the connecting structure 30 and hence the vehicle frame 12 is larger than the actuating force provided by one actuator 32. This is particularly beneficial in that the typical linear actuators commonly used in typical simulators can be used in the full motion racing simulator 10 constructed based on a real motor vehicle despite its heavy weight. A typical linear actuator for a typical simulator generally has a low load rating in order to provide a quick response and thus generally provides a maximum of 6" of travel with a 500 lb (227 kilograms) force limit. An actual automobile, however, typically weigh 3000 to 4000 pounds (i.e., 1361 to 1816 kilograms) for a sedan or even over 6000 pounds (i.e., 2722 kilograms) for a pickup truck. The rocker arm 36 in each of the actuating assemblies 22 can increase the mechanical advantage of the actuating assemblies 22. Therefore, the vehicle frame 12 can be lifted, lowered or tilted by four actuating assemblies having four actuators 32.

Figure 3:
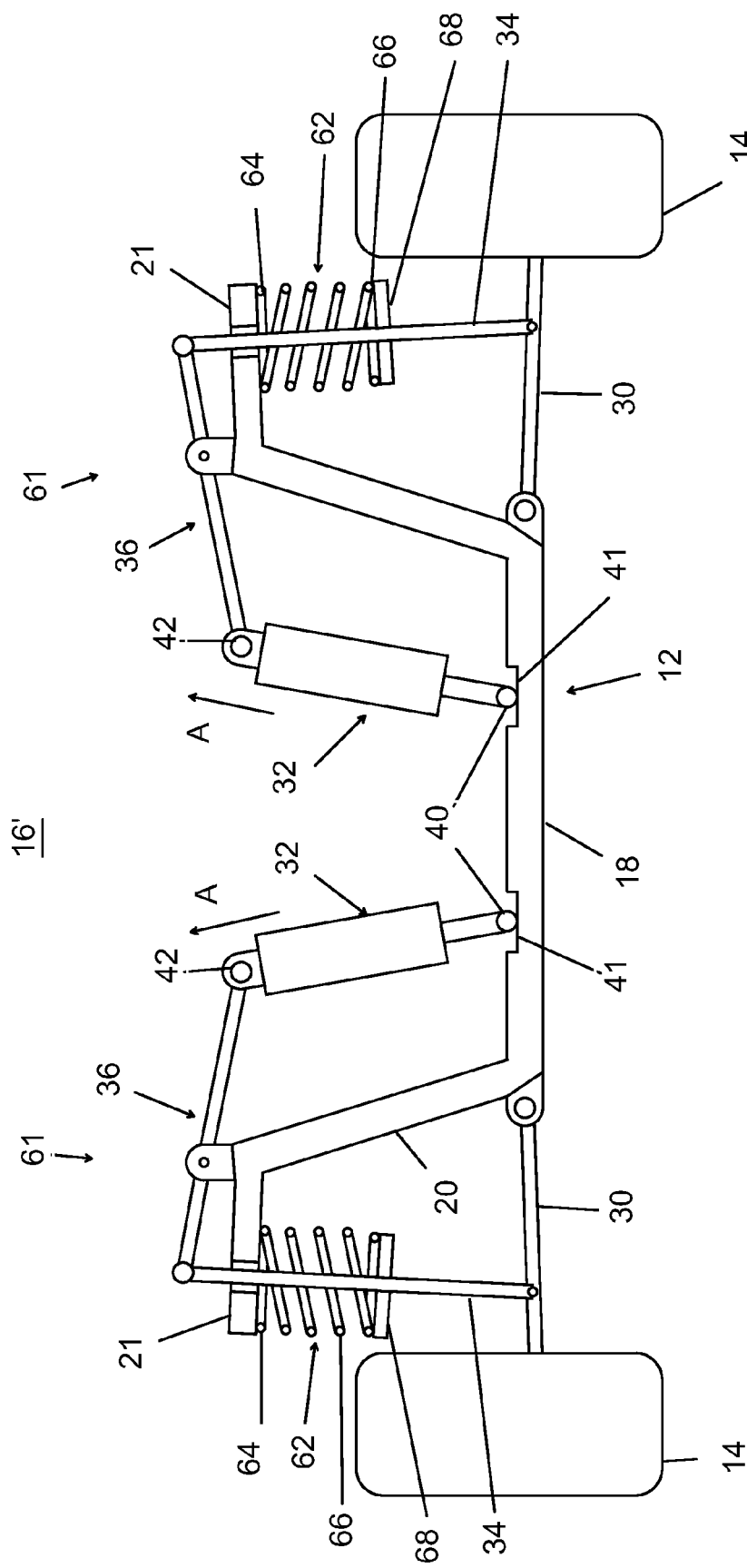
FIG. 3 is a schematic diagram of an actuating system for a full motion racing simulator according to a variant of the first embodiment of the present disclosure.

Referring to FIG. 3, a variant of the actuating system of the first embodiment is shown to be structurally similar to that shown in FIG. 2 except that the actuating system 16' further includes a compression spring 62 and associated mounting structure for each of the actuating assemblies 61. Therefore, like reference numbers are used for like elements and the detailed description of these elements is omitted herein for clarify.

More specifically, the actuating system 16' include four actuating assemblies 61, among which two are mounted to a front portion of the vehicle frame 12 and two are mounted to a rear portion of the vehicle frame 12. The actuating assemblies 61 each include a connecting structure 30, an actuator 32, a push element 34, a rocker arm 36, and a compression spring 62 disposed around the push element 34.

The compression spring 62 has a first end 64 secured to a frame extension 21 extending from the side frame 20, and a second end 66 secured to the push element 34, for example, by a flange 68. As an example, the first end 64 and the second end 66 of the compression spring 62 is secured to the frame extension 21 and the flange 68 (and hence the push element 34), respectively, by welding. The flange 68 is fixed to the push element 34, for example, by welding. The frame extension 21 may be an integral part of the vehicle frame 12 or an external component welded to the vehicle frame 12. The compression spring 62 is pre-loaded and helps carry some weight of the vehicle frame 12 so that the actuating system 16' has an increased load capacity and can be used to move, tilt a vehicle frame 12 with heavier weight. As the vehicle frame 12 is lifted, the compression springs 62 extend and help carry less load, therefore putting more load on the actuators 32. As the vehicle frame 12 is lowered, the compression springs 62 are compressed more and help carry more load, therefor putting less load on the actuators 32.

When the actuator 32 of each actuating assembly 61 extends in direction A, the rocker arm 36 is caused to rotate to push the push element 34 downward. This causes the frame 12 to lift and consequently the compression spring 62 helps carrying less load. The spring-rate and pre-load amount of the compression spring 62 are properly selected such that the actuator 32 will not experience over-load during duration of its travel. When the actuator 32 is de-actuated, the rocker arm 36 is rotated in a reverse direction, causing the push element 64 to move up. The push element 34 is moved back to its original position by the actuator 32 and the restoring force of the compression spring 62. Therefore, the actuating system 60 according to the present embodiment can have improved load capacity to move and/or tilt the motor vehicle.

Figure 4:
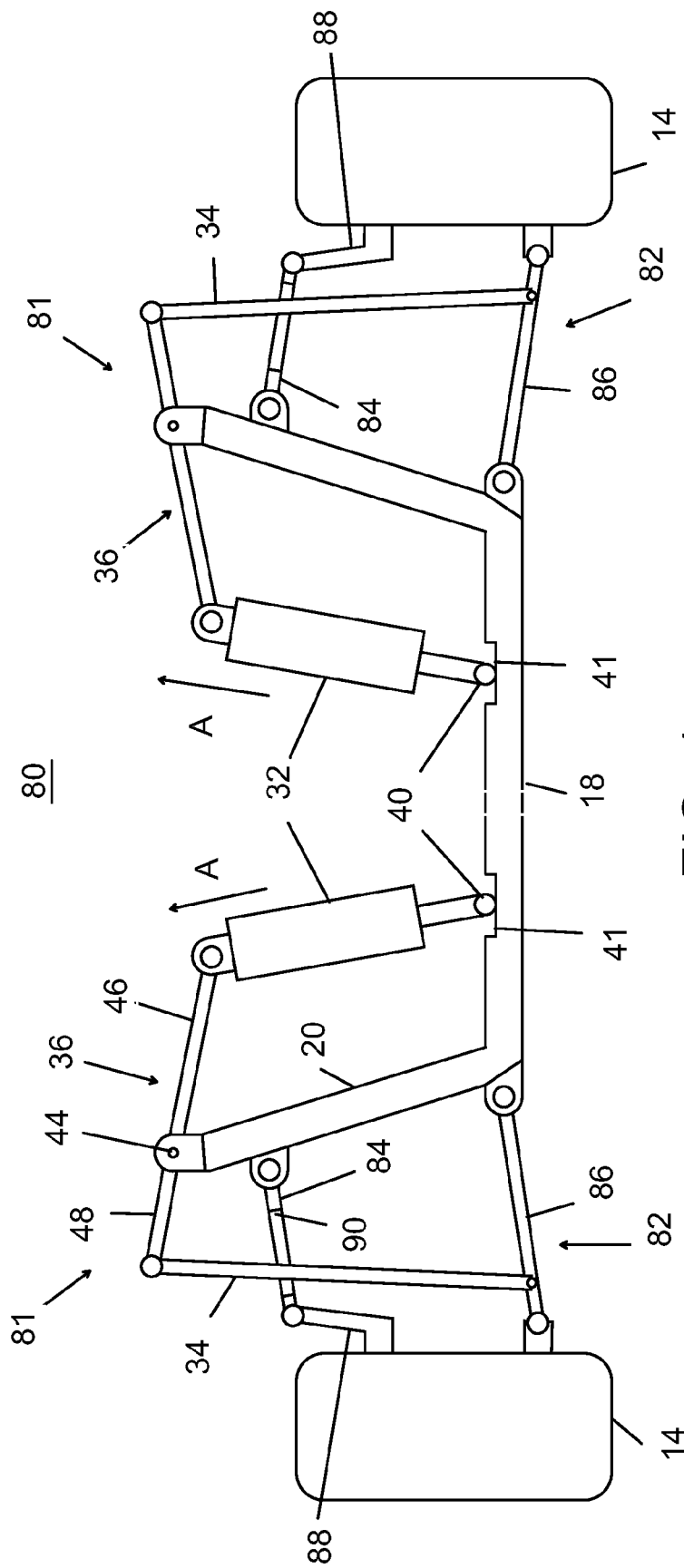
FIG. 4 is a schematic diagram of an actuating system for a full motion racing simulator according to a second embodiment of the present disclosure.

Referring to FIG. 4, a full motion racing simulator according to a second embodiment of the present application is configured by using a motor vehicle having a double A-arm (or double wishbone) type suspension, which includes an upper control arm, a lower control arm, and a shock absorber disposed between the upper and lower control arms. The actuating system 80 of the second embodiment is configured based on the double A-arm suspension and thus includes the upper and lower control arms of the double A-arm suspension system as the connecting structure 82 for pivotably connecting the vehicle frame 12 to the wheel hubs 24 of the wheels 14. The actuating system 80 of the present embodiment is structurally similar to the actuating system 16 of FIG. 2 except for the connecting structure. Therefore, like reference numbers are used for like elements and the detailed description of these elements is omitted herein for clarify.

More specifically, the actuating system 80 includes four actuating assemblies 81 (only two are shown in FIG. 4), each including an actuator 32, a push element 34, a rocker arm 36, and a connecting structure 82 for pivotably connecting the vehicle frame 12 to the wheel hubs 24 of the wheels 14. The actuator 32 of each actuating assembly 81 is extendable along direction A when actuated and is retractable when de-actuated. The connecting structure 82 includes an upper arm 84 and a lower arm 86. The upper arm 84 defines an opening 90 through which the push element 34 extends. The upper arm 84 and the lower arm 86 of the connecting structure 82 may have a structure similar to the upper and lower A-arms of the typical double A-arm suspension system.

The upper arm 84 and the lower arm 86 are pivotably mounted to the vehicle frame 12 and the hub extension 88. The hub extension 88 extends from and is secured to the hub 24 of the wheel 14. The push element 34 is pivotably connected to the rocker arm 36 and the lower arm 86 of the connecting structure 82.

When the upper end 42 of the actuator 32 extends in direction A in response to actuation of the actuator 32, the rocker arm 36 is caused to rotate relative to the vehicle frame 12. The second portion 48 of the rocker arm 36 pushes the push element 34 downward, which in turns, causes the lower arm 86 of the connecting structure 82 to pivot. The pivoting of the lower arm 86 relative to the hub 24 causes the vehicle frame 12 and the upper arm 84 of the connecting structure 82 to pivot, thereby causing the vehicle frame 12 to move, pivot, or tilt.

Figure 5:
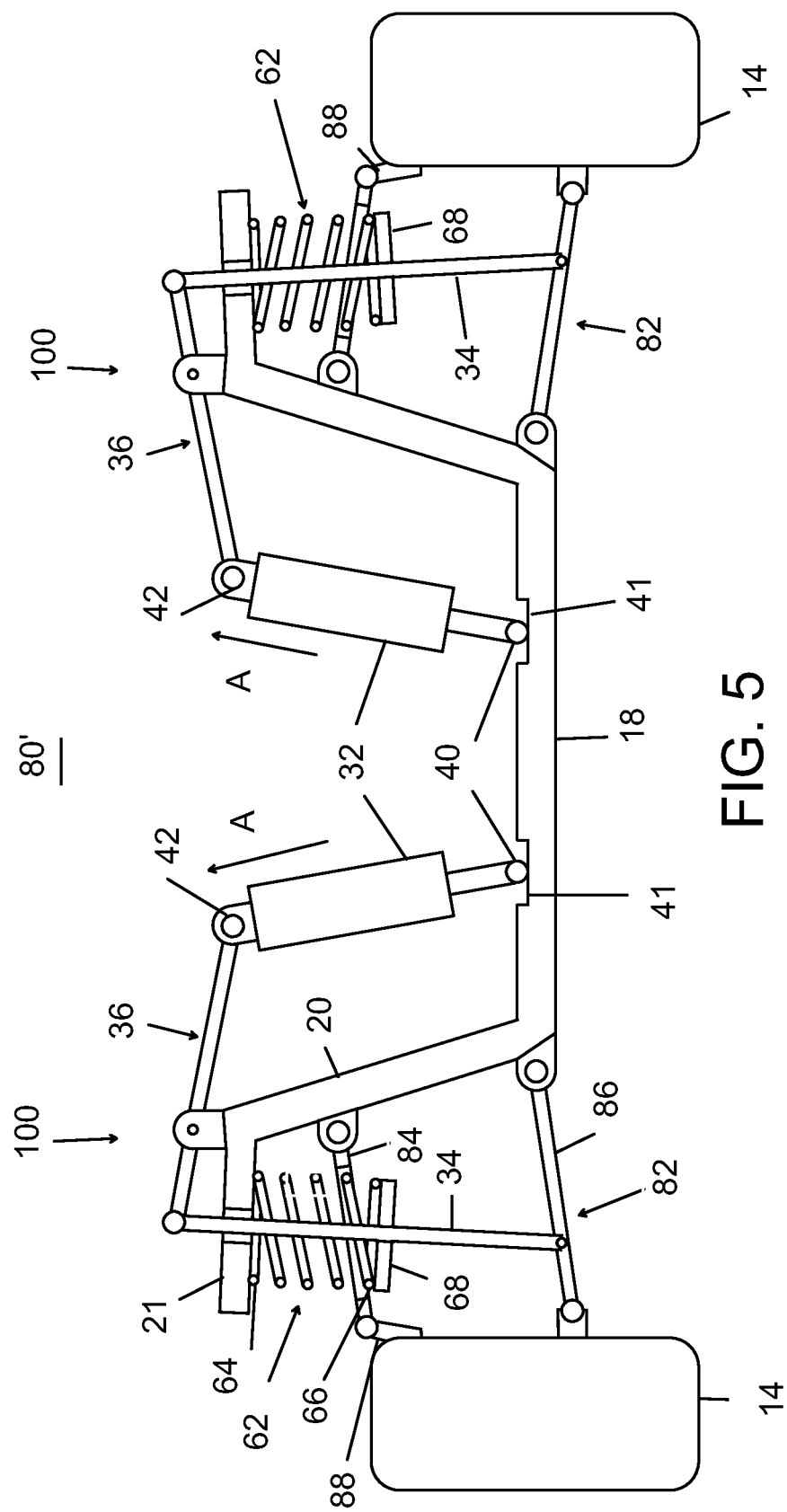
FIG. 5 is a schematic diagram of an actuating system for a full motion racing simulator according to a variant of the second embodiment of the present disclosure.

Referring to FIG. 5, a variant of the actuating system for a full motion racing simulator of the second embodiment is structurally similar to that of FIG. 4 except that the actuating system 80' further includes a compression spring 62 for each of the actuating assemblies 100. The compression spring 62 is similar to that in FIG. 3 and has an upper end 64 secured to a frame extension 21 extending from the vehicle frame 12 and a lower end 66 secured to a flange 68 fixed to the push element 34. The compression spring 62 extends through the opening 90 of the upper arm 84 of the connecting structure 82. As described in connection with FIG. 3, the compression spring 62 can increase load capacity of the actuating system 80'.

Figure 6:
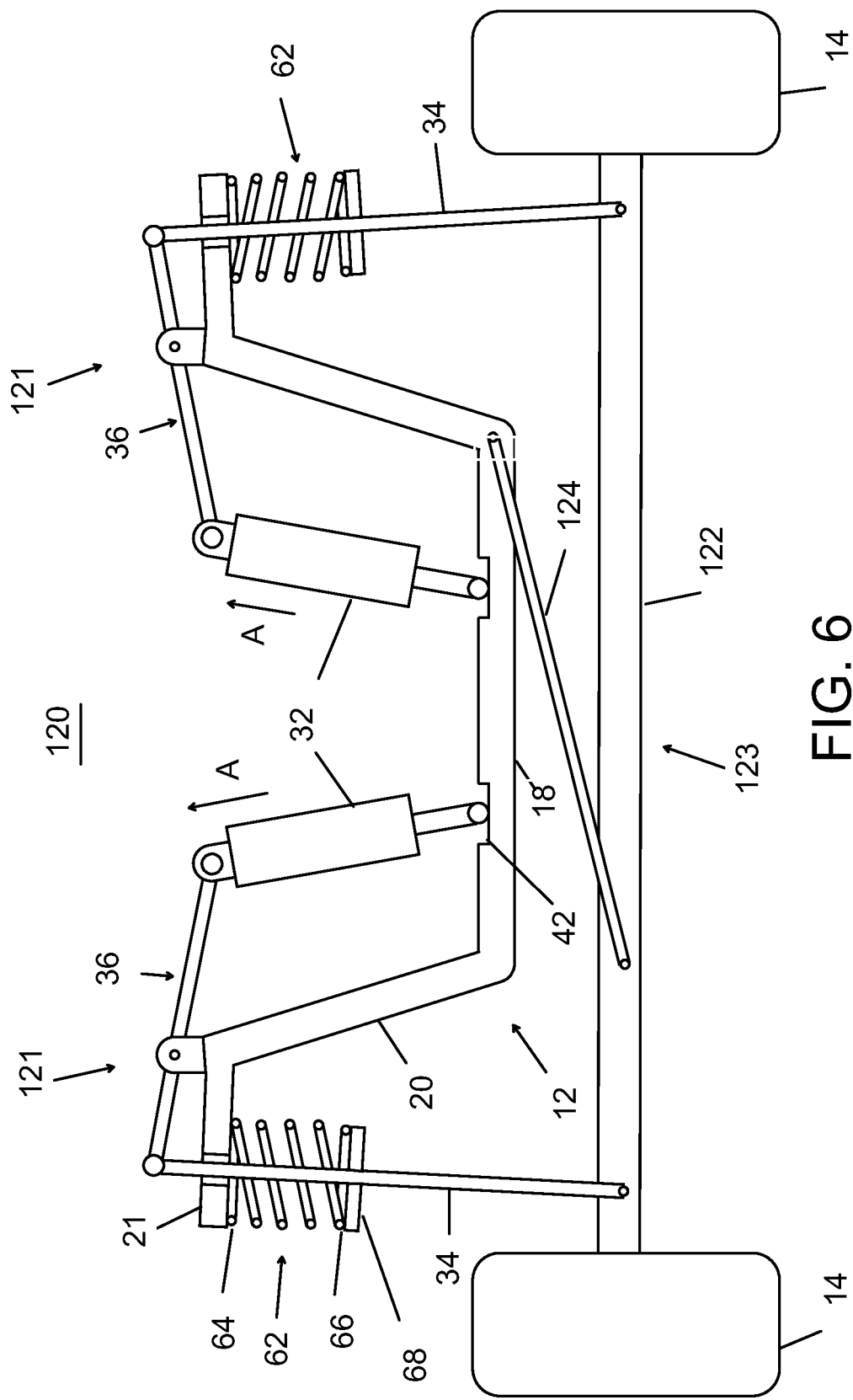
FIG. 6 is a schematic diagram of an actuating system for a full motion racing simulator according to a third embodiment of the present disclosure.

Referring to FIG. 6, an actuating system 120 for a full motion racing simulator according to a third embodiment of the present disclosure is configured to be mounted to a motor vehicle having a beam axle (or solid axle) suspension system. In the beam axle suspension system, which is a dependent suspension design, the pair of front or rear wheels 14 are laterally connected by a single beam axle 122, which supports the vehicle frame 12 thereon. The vehicle frame 12 is pivotably connected to and supported on the beam axle 122 by a pivoting member 124.

The actuating system 120 for the full motion racing simulator of the present embodiment is structurally similar to that of FIG. 3, except for the connection between the vehicle frame 12 and the wheel hubs 24. Like reference numbers are used for like elements and the detailed description thereof is omitted herein for clarify.

In the present embodiment, the vehicle frame 12 is pivotably connected to beam axle 122 by the pivoting member 124 and the beam axle 122 is connected to the wheel hubs 24 of the front or rear pair of the wheels. The push elements 34 of the actuating assemblies 121 mounted at a front or rear portion of the vehicle frame 12 are pivotably mounted to the beam axle 122.

The actuating system 120 includes four actuating assemblies (only two are shown in FIG. 6) each including an actuator 32 and a rocker arm 36, a push element 34. A pair of actuating assemblies 121 mounted at the front or rear portion of the vehicle frame 12 are pivotably mounted to the wheel hubs 24 of the front or rear pair of wheels 14 by one connecting structure 123 which includes the beam axle 123 and the pivoting member 124. The pivoting member 124 pivotably connects the vehicle frame 12 to the beam axle 122. The push element 34 is pivotaby mounted to the beam axle 122 of the connecting structure 123.

When the upper end 42 of the actuator 32 extends in direction A, the rocker arm 36 is caused to rotate relative to the vehicle frame 12. The second portion 48 of the rocker arm 36 pushes the push element 34 downward and consequently causes the vehicle frame 12 to move, pivot, or tilt. The wheels 14 which include rubber tires around the hubs 24 are flexible and the hubs 24 are pivotable relative to the rubber tires. Therefore, when the actuating assemblies 22 articulate to cause the push element 34 to push or pull the beam axle 122, the wheels 14 may be tilted relative to the ground, resulting in a change in camber angle.

While FIG. 6 shows a compression spring 62 for each actuating assembly 121 for increased load capacity, the compression spring 62 can be eliminated for a motor vehicle with a lighter weight without departing from the scope of the present disclosure.

Figure 7:
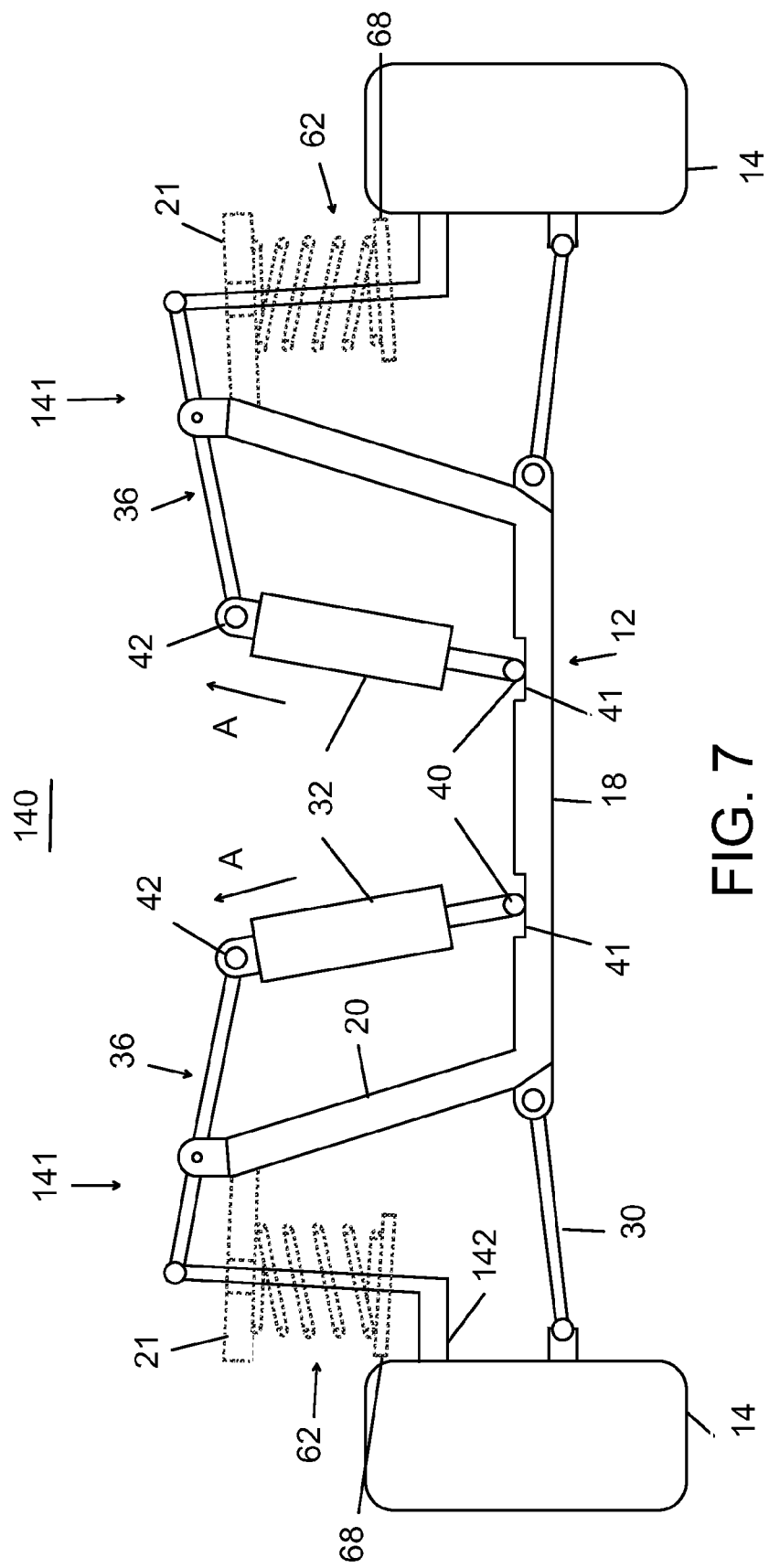
FIG. 7 is a schematic diagram of an actuating system for a full motion racing simulator according to a fourth embodiment of the present disclosure.

Referring to FIG. 7, an actuating system 140 for a full motion racing simulator according to a fourth embodiment of the present disclosure is configured to be used in a motor vehicle having a MacPherson strut suspension system. The MacPherson strut suspension system includes only a lower A-arm, as opposed to the double A-arm suspension that includes double A-arms. The actuating system 140 according to the fourth embodiment of the present application is structurally similar to that of FIGS. 2 and 3 except for the structure of the push element. Therefore, like references are used for like elements and the detailed description of these elements are omitted herein for clarify.

The actuating system 140 includes four actuating assemblies 141 each including an actuator 32, a rocker arm 36, a connecting structure 30 and a push element 142. The push element 142 in the present embodiment is in the form of a hub extension secured to and extending from the hub 24. The connecting structure 30 has a structure similar to a lower control arm of a MacPherson strut suspension.

Alternatively and optionally, the actuating system 140 may further include a compression spring 62 (shown in broken lines) fixed to a frame extension 21 (shown in broken lines) extending from the side frame 20 of the vehicle frame 12 and a flange 68 mounted to the push element 142 to increase the load capacity of the actuating system 140. The mounting of the compression spring 62 to the vehicle frame 12 and push element 34 and the flange 68 and the function of the compression has been described in connection with FIG. 3 and thus the description thereof is omitted herein for clarity.

When the upper end 42 of the actuator 32 extends in direction A due to actuation of the actuator 32, the rocker arm 36 is caused to rotate relative to the vehicle frame 12. The second portion 48 of the rocker arm 36 pushes the push element 34 downward, which in turns, causes the hub 24 of the wheel 14 to pivot. The pivoting of the hub 24 causes the connecting structure 30 to pivot, thereby causing the vehicle frame 12 to move, pivot, or tilt. The pivoting of the hub 24 may also cause the wheels 14 to tilt relative to the ground, resulting in a change in the camber angle. Therefore, a user who sits in the car seat experiences movement of the car.

It is understood that the full motion racing simulators of the present disclosure can be configured based on any motor vehicle including but not limited to sedan, SUV, and trucks, regardless of the types of the suspension used in the motor vehicle. The actuating systems 16, 16', 80, 80', 120, 140 in any of the embodiments can be configured to use part of components of existing suspension systems to pivotably support the vehicle frame 12 on the wheels 14, thereby forming a full motion racing simulator 10 as shown in FIG. 1. The existing suspension system that can be reconfigured to form the actuating system of the present application may include, but not be limited to a MacPherson strut suspension system, a double wishbone type suspension system, a solid front or rear axle suspension system, a multi-link suspension, or a twin I-beam suspension, etc.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An actuating system for a full motion racing simulator for movably supporting a vehicle frame on a support structure, the actuating system comprising at least one actuating assembly comprising:
   an actuator pivotably connected to the vehicle frame;
   a push element;
   a rocker arm rotatably mounted to the vehicle frame and pivotably connected to the push element and the actuator; and
   a connecting structure pivotably connected to the vehicle frame and the support structure,
   wherein, upon actuation of the actuator, the actuator causes the rocker arm to rotate relative to the vehicle frame such that the rocker arm pushes the push element and the push element moves the vehicle frame through the connecting structure.

2. The actuating system of claim 1, wherein the connecting structure is pivotably mounted to the support structure.

3. The actuating system of claim 1, wherein the actuator includes a first end pivotably and movably mounted to the frame and a second end pivotably mounted to the rocker arm.

4. The actuating system of claim 3, wherein the rocker arm includes a pivot rotatably mounted to the frame, a first portion pivotably connected to the second end of the actuator, and a second portion pivotably connected to the push element.

5. The actuating system of claim 4, wherein the first portion of the rocker arm is longer than the second portion of the rocker arm.

6. The actuating system of claim 1, wherein the push element is pivotably mounted to one of the connecting structure and the support structure.

7. The actuating system of claim 1, further comprising a compression spring disposed around the push element.

8. The actuating system of claim 7, wherein the compression spring includes an end secured to the push element and the other end mounted to the frame such that when the push element is moved, the push element causes the compression spring to stretch or compress.

9. The actuating system of claim 1, wherein the connecting structure includes a beam axle connecting and disposed between a pair of wheels and a pivoting member pivotably connecting the vehicle frame to the beam axle.

10. The actuating system of claim 9, wherein the push element is pivotably connected to the beam axle.

11. The actuating system of claim 1, further comprising four actuating assemblies.

12. The actuating system of claim 1, further comprising a ball joint for pivotably and movably mounting the actuator to the frame.

13. The actuating system of claim 1, wherein the connecting structure includes a lower arm and an upper arm pivotably mounted to the support structure and the vehicle frame.

14. A full motion racing simulator, comprising:
 a support structure;
 a vehicle frame;
 an actuating system for moveably supporting the vehicle frame on the support structure, the actuating system comprising a plurality of actuating assemblies each comprising:
  an actuator pivotably connected to the vehicle frame;
  a push element;
  a rocker arm rotatably mounted to the vehicle frame and pivotably connected to the push element and the actuator; and
  a connecting structure pivotably connected to the vehicle frame and the support structure,
 wherein, upon actuation of the actuator, the actuator causes the rocker arm to rotate relative to the vehicle frame such that the rocker arm pushes the push element and the push element moves the vehicle frame through the connecting structure.

15. The full motion racing simulator of claim 14, wherein the connecting structure is disposed between and pivotably connected to the vehicle frame and the support structure.

16. The full motion racing simulator of claim 15, wherein the push element is pivotably mounted to the connecting structure.

17. The full motion racing simulator of claim 14, wherein the support structure includes four wheels.

18. The full motion racing simulator of claim 14, further comprising a compression spring mounted around the push element in each of the actuating assemblies and secured to the vehicle frame.

19. The full motion racing simulator of claim 14, wherein the connecting structure includes a beam axle connecting and disposed between a pair of wheels and a pivoting member pivotably connected between the vehicle frame and the beam axle.

20. A full motion racing simulator, comprising:
 wheels;
 a vehicle frame including a base frame and a side frame extending upwardly from the base frame;
 a plurality of actuating assemblies for moveably supporting the vehicle frame on the wheels and moving the vehicle frame, the actuating assemblies each comprising:
  a connecting structure pivotably connected to a corresponding one of the wheels, the connecting structure supporting the vehicle frame thereon;
  an actuator pivotably and movably mounted to the base frame;
  a push rod pivotably connected to the connecting structure; and
  a rocker arm rotatably mounted to the side frame and including a first portion pivotably connected to the actuator and a second portion pivotably connected to the push element,
 wherein, upon actuation of the actuator, the actuator causes the rocker arm to rotate relative to the frame and to push the push element such that the push element causes the connecting structure to pivot relative to the wheels and to move the vehicle frame.

* * * * *